(12) United States Patent
Kojima

(10) Patent No.: US 9,835,341 B2
(45) Date of Patent: Dec. 5, 2017

(54) AIR CONDITIONER

(71) Applicant: DAIKIN INDUSTRIES, LTD., Osaka-shi, Osaka (JP)

(72) Inventor: Akiharu Kojima, Sakai (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 359 days.

(21) Appl. No.: 14/763,438

(22) PCT Filed: Jan. 28, 2014

(86) PCT No.: PCT/JP2014/051839
§ 371 (c)(1),
(2) Date: Jul. 24, 2015

(87) PCT Pub. No.: WO2014/115891
PCT Pub. Date: Jul. 31, 2014

(65) Prior Publication Data
US 2015/0369497 A1   Dec. 24, 2015

(30) Foreign Application Priority Data
Jan. 28, 2013   (JP) .................................. 2013-013448

(51) Int. Cl.
*F25B 49/02* (2006.01)
*F24F 5/00* (2006.01)
*F25B 13/00* (2006.01)

(52) U.S. Cl.
CPC .............. *F24F 5/001* (2013.01); *F25B 49/02* (2013.01); *F25B 13/00* (2013.01);
(Continued)

(58) Field of Classification Search
CPC .. F25B 49/02; F25B 13/00; F25B 2313/0233; F25B 2700/2104; F25B 2700/1933; F25B 2600/021; F25B 2500/19; Y02B 30/741
See application file for complete search history.

(56) References Cited

U.S. PATENT DOCUMENTS

| | | | |
|---|---|---|---|
| 6,739,143 B1 * | 5/2004 | Kita ................... | F25B 9/002 62/114 |
| 2009/0025406 A1 * | 1/2009 | Yoshimi ............. | F24F 11/008 62/127 |

(Continued)

FOREIGN PATENT DOCUMENTS

| JP | 58-69764 U | 5/1983 |
|---|---|---|
| JP | 62-34563 B2 | 7/1987 |

(Continued)

*Primary Examiner* — Kun Kai Ma
(74) *Attorney, Agent, or Firm* — Birch, Stewart, Kolasch & Birch, LLP

(57) ABSTRACT

The present invention relates to an air conditioner that adjusts room temperature to a set temperature, and the problem to be solved thereby is to reduce the frequency of occurrence of situations in which the room temperature does not approach the set temperature. In the air conditioner, a target suction pressure is set to a value obtained by subtracting, from an evaporation pressure of an indoor heat exchanger, a pressure loss estimation value from an inlet of the indoor heat exchanger to a suction port of a compressor so that an evaporation temperature of the indoor heat exchanger is maintained constant. The displacement of the compressor is controlled so that the suction pressure becomes equal to the target suction pressure. A deviation determination unit determines whether the room temperature is stabilized at a temperature deviated from the set temperature. When the deviation determination unit determines that the room temperature is deviated from the set temperature, a controller changes the pressure loss estimation value so that the room temperature approaches the set temperature.

12 Claims, 7 Drawing Sheets

(52) U.S. Cl.
CPC ... *F25B 2313/0233* (2013.01); *F25B 2500/19* (2013.01); *F25B 2600/021* (2013.01); *F25B 2700/1933* (2013.01); *F25B 2700/2104* (2013.01); *Y02B 30/741* (2013.01)

(56) References Cited

U.S. PATENT DOCUMENTS

| | | | | |
|---|---|---|---|---|
| 2010/0154447 A1* | 6/2010 | Yoshimi | ............... | F25B 49/005 62/149 |
| 2011/0132011 A1* | 6/2011 | Kojima | ............... | F24F 11/0079 62/180 |
| 2011/0308267 A1* | 12/2011 | Tamaki | ............... | F25B 45/00 62/222 |
| 2015/0362238 A1* | 12/2015 | Tanaka | ............... | F25B 13/00 62/115 |
| 2016/0097568 A1* | 4/2016 | Korenaga | ............... | F25B 13/00 62/160 |
| 2016/0223236 A1* | 8/2016 | Kimura | ............... | F24F 3/065 |

FOREIGN PATENT DOCUMENTS

| | | | |
|---|---|---|---|
| JP | 2-195155 A | | 8/1990 |
| JP | 05288413 A | * | 11/1993 |
| JP | 8-68568 A | | 3/1996 |
| JP | 3028008 B2 | | 4/2000 |
| JP | 2002-61925 A | | 2/2002 |
| JP | 2003-294294 A | | 10/2003 |
| JP | 2006-250440 A | | 9/2006 |
| JP | 2006250440 A | * | 9/2006 |
| JP | 3985092 B2 | | 10/2007 |

* cited by examiner

AIR CONDITIONER

TECHNICAL FIELD

The present invention relates to an air conditioner that adjusts room temperature to a set temperature.

BACKGROUND ART

Patent document 1 describes a known technique that makes room temperature approach a set temperature.

In the technique, the evaporation temperature is set at a predetermined value (hereafter, referred to as the "set evaporation temperature") so that the room temperature approaches the set temperature. Then, the displacement of a compressor is controlled so that the evaporation temperature is maintained at the set evaporation temperature. Consequently, the room temperature approaches the set temperature.

In the case of this technique, the evaporation pressure is maintained at a set evaporation pressure so that the evaporation temperature is maintained at the set evaporation temperature (e.g., 5° C.) during a cooling operation. Additionally, to maintain the evaporation pressure at the set evaporation pressure, the suction pressure of the compressor, which is correlated with the evaporation pressure, is used as a control parameter. The operating frequency of a motor of the compressor is controlled so that the suction pressure approaches a target suction pressure, which corresponds to the set evaporation temperature.

During a cooling operation, a pressure loss occurs in a low pressure refrigerant circuit, which extends from the indoor heat exchanger to the compressor. The pressure loss differs between air conditioners. The value of the pressure loss varies depending on the installation condition of each air conditioner. Such a variation is mainly caused by the length of a low pressure refrigerant connection pipe extending from the indoor heat exchanger to the compressor.

Under the assumption that the evaporation pressure is equal to the suction pressure, the displacement of the compressor may be controlled so that the suction pressure approaches the target suction pressure, which corresponds to the set evaporation temperature. In such a case, since the pressure loss is not considered, the evaporation pressure may fail to approach the set evaporation pressure.

In this regard, patent document 2 describes a technique in which the pressure loss is considered when the displacement of a compressor is controlled so that the refrigerant suction pressure approaches a target suction pressure. More specifically, during a test-run performed when installing an air conditioner, a pressure loss estimation value, which is a correction amount for the suction pressure, is obtained. Then, the target suction pressure is set taking into consideration the pressure loss estimation value. In this manner, the target suction pressure is changed to a value that takes the pressure loss estimation value into consideration. Thus, the evaporation pressure can quickly approach the set evaporation pressure.

PRIOR ART DOCUMENTS

Patent Documents

Patent Document 1: Japanese Laid-Open Utility Model Publication No. 58-69764

Patent Document 2: Japanese Laid-Open Patent Publication No. 2-195155

SUMMARY OF THE INVENTION

Problems that are to be Solved by the Invention

However, even in the technique described in patent document 2, the evaporation pressure does not approach the set evaporation pressure under certain operational conditions. As a result, the room temperature may fail to approach the set temperature.

Accordingly, it is an object of the present invention to provide an air conditioner that reduces the frequency of occurrence of situations in which the room temperature does not approach the set temperature.

Means for Solving the Problem

To solve the problem, an air conditioner includes an indoor unit, an outdoor unit, a controller, and a deviation determination unit. The indoor unit includes an expansion valve and an indoor heat exchanger that exchanges heat with indoor air. The outdoor unit includes an inverter-controlled variable-displacement compressor and an outdoor heat exchanger that exchanges heat with outdoor air. The controller sets a target suction pressure to a value obtained by subtracting a pressure loss estimation value, which pressure loss occurs from an inlet of the indoor heat exchanger to a suction port of the compressor, from an evaporation pressure of the indoor heat exchanger so that an evaporation temperature of the indoor heat exchanger is maintained constant. The controller controls displacement of the compressor so that a suction pressure becomes equal to the target suction pressure and room temperature approaches a set temperature during a cooling operation. The deviation determination unit determines whether or not the room temperature is stabilized at a temperature deviated from the set temperature. When the deviation determination unit determines that the room temperature is stabilized at a temperature deviated from the set temperature, the controller changes the pressure loss estimation value so that the room temperature approaches the set temperature.

In a conventional air conditioner, the target suction pressure is set taking into consideration the pressure loss estimation value. However, when the pressure loss estimation value is inappropriately set and deviated from an actual pressure loss, the evaporation pressure does not approach the set evaporation pressure. Consequently, the room temperature does not approach the set temperature.

In this regard, in the above configuration, when the room temperature is stabilized at a temperature deviated from the set temperature, the pressure loss estimation value is changed so that the room temperature approaches the set temperature. Thus, the pressure loss estimation value becomes closer to the actual pressure loss. This reduces the frequency of occurrence of situations in which the room temperature does not approach the set temperature.

Preferably, in the air conditioner having the above configuration, the deviation determination unit determines that the room temperature is stabilized at a temperature deviated from the set temperature when a situation continues for a set time or longer where a deviation temperature, which indicates an absolute value of a difference between the room temperature and the set temperature, exceeds a predetermined tolerable temperature range and a fluctuation range of the absolute value of the difference between the set temperature and the room temperature is less than or equal to a tolerable value.

Conversely, in this configuration, when the deviation temperature temporarily exceeds the predetermined tolerable temperature range or the fluctuation range of the absolute value of the difference between the set temperature and the room temperature is temporarily less than or equal to the tolerable value, it is not determined that the room temperature is stabilized at a temperature deviated from the set temperature. Thus, the pressure loss estimation value is not changed. This limits an improper changing of the pressure loss estimation value.

Preferably, in the air conditioner having the above configuration, the controller calculates the pressure loss estimation value based on an operating frequency of the compressor and a pressure loss coefficient, which is uniquely set for the air conditioner, and changes the pressure loss estimation value by correcting the pressure loss coefficient based on a difference between the suction pressure of the compressor and the evaporation pressure of the indoor heat exchanger that are obtained when changing the pressure loss estimation value.

The pressure loss occurring from the inlet of the indoor heat exchanger to the suction port of the compressor varies in accordance with the operating frequency of the compressor. Thus, in the above configuration, the pressure loss estimation value is calculated based on the operating frequency of the compressor and the pressure loss coefficient. This allows the pressure loss estimation value to be set to a value in correspondence with the operational state of the compressor.

Additionally, the pressure loss coefficient is corrected based on the difference between the suction pressure of the compressor and the evaporation pressure of the indoor heat exchanger that are obtained when changing the pressure loss estimation value. This changes the pressure loss estimation value. More specifically, the pressure loss coefficient is corrected based on the suction pressure of the compressor and the evaporation pressure of the indoor heat exchanger, each of which is a measured value. This allows the pressure loss coefficient to be set to a value that corresponds to the pressure loss of the air conditioner at the time of changing the pressure loss estimation value. Thus, the pressure loss estimation value can be appropriately set to a value suitable for the actual state.

Preferably, in the air conditioner having the above configuration, the controller calculates the pressure loss estimation value based on an operating frequency of the compressor and a pressure loss coefficient, which is uniquely set for the air conditioner. When changing the pressure loss estimation value, the controller changes the pressure loss coefficient to a value larger than that prior to being changed when the room temperature is higher than the set temperature, and changes the pressure loss coefficient to a value smaller than that prior to being changed when the room temperature is lower than the set temperature.

In this configuration, the pressure loss estimation value is changed by changing the pressure loss coefficient using the predetermined calculation. This changing process does not use data that needs to be measured, such as the suction pressure and the evaporation pressure. Thus, the pressure loss coefficient can be changed even when the operation of the compressor is being stopped.

Preferably, in the air conditioner having the above configuration, the indoor unit is one of a plurality of indoor units, and the controller calculates an average value of evaporation pressures of the indoor units and uses the calculated value as the evaporation pressure of the indoor heat exchanger when setting the target suction pressure.

In this configuration, the target suction pressure may be calculated for an air conditioner having a plurality of indoor units. Thus, in the same manner as the above air conditioner, when the room temperature is stabilized at a temperature deviated from the set temperature, the pressure loss estimation value can be changed so that the room temperature approaches the set temperature. This reduces the frequency of occurrence of situations in which the room temperature does not approach the set temperature.

To solve the problem, an air conditioner includes an indoor unit, an outdoor unit, and a controller. The indoor unit includes an expansion valve and an indoor heat exchanger that exchanges heat with indoor air. The outdoor unit includes an inverter-controlled variable-displacement compressor and an outdoor heat exchanger that exchanges heat with outdoor air. The controller sets a target suction pressure to a value obtained by subtracting a pressure loss estimation value, which pressure loss occurs from an inlet of the indoor heat exchanger to a suction port of the compressor, from an evaporation pressure of the indoor heat exchanger so that an evaporation temperature of the indoor heat exchanger is maintained constant. The controller controls displacement of the compressor so that a suction pressure becomes equal to the target suction pressure and room temperature approaches a set temperature during a cooling operation. When the room temperature decreases to below a lower limit set temperature, which is assigned to the set temperature, the controller executes a thermostat control that stops operation of the compressor. When the controller stops the operation of the compressor through the thermostat control, the controller changes the pressure loss estimation value so that the room temperature approaches the set temperature.

When the pressure loss estimation value is excessively larger than the actual value, the room temperature continues to decrease below the set temperature. Consequently, the thermostat control stops the operation of the compressor. Conversely, occurrence of a state in which the operation of the compressor is stopped by the thermostat operation refers to a state in which the pressure loss estimation value is not appropriately set. Thus, in the above configuration, when the operation of the compressor is being stopped by the thermostat operation, the pressure loss estimation value is changed. This reduces the frequency of occurrence of situations in which the room temperature does not approach the set temperature.

Preferably, in the air conditioner having the above configuration, the controller calculates the pressure loss estimation value based on an operating frequency of the compressor and a pressure loss coefficient, which is uniquely set for the air conditioner, and when changing the pressure loss estimation value, the controller changes the pressure loss coefficient to a value smaller than that prior to being changed.

In this configuration, when changing the pressure loss estimation value, the pressure loss coefficient is changed to a value smaller than that prior to being changed. This changing process does not use data that needs to be measured, such as the suction pressure and the evaporation pressure. Thus, the pressure loss coefficient can be changed even when the operation of the compressor is being stopped.

Effect of the Invention

Since when the room temperature is stabilized at a temperature deviated from the set temperature, the pressure loss estimation value is controlled so that the room temperature approaches the set temperature, the air conditioner succeeds in reducing the frequency of occurrence of situations in which the room temperature does not approach the set temperature.

MODES FOR CARRYING OUT THE INVENTION

Figure 1:
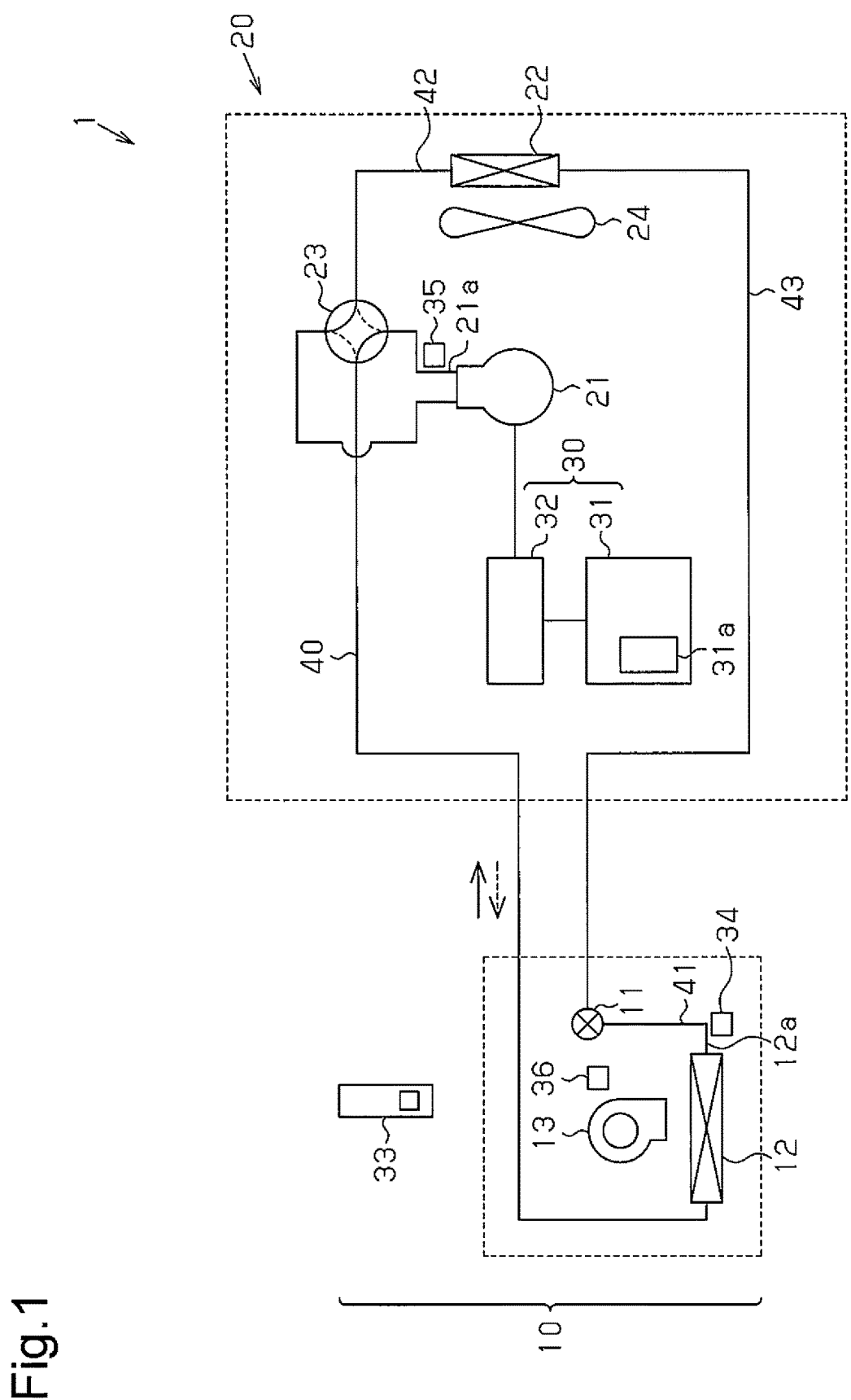
FIG. 1 is a schematic diagram of an air conditioner.

One example of an air conditioner 1 will now be described with reference to FIG. 1.

The air conditioner 1 includes an indoor unit 10 located inside a room and an outdoor unit 20 located outside the room.

The indoor unit 10 includes an expansion valve 11 expanding a refrigerant, an indoor heat exchanger 12 exchanging heat between the refrigerant and the indoor air, and an indoor fan 13 drawing in the indoor air and sending the air through the indoor heat exchanger 12 to the interior of the room.

The outdoor unit 20 includes a compressor 21, an outdoor heat exchanger 22 exchanging heat between the refrigerant and the outdoor air, a four-passage switch valve 23, a controller 30, an outdoor fan 24 drawing in the outdoor air and sending the air to the outdoor heat exchanger 22. The expansion valve 11, the indoor heat exchanger 12, the compressor 21, the outdoor heat exchanger 22, and various connection pipes 40, 41, 42, 43 form a refrigerant circuit.

The various connection pipes include a first connection pipe 41 connecting the expansion valve 11 and the indoor heat exchanger 12, a low pressure refrigerant connection pipe 40 connecting the indoor heat exchanger 12 and the compressor 21, a second connection pipe 42 connecting the compressor 21 and the outdoor heat exchanger 22 via the four-passage switch valve 23, and a third connection pipe 43 connecting the outdoor heat exchanger 22 and the expansion valve 11.

The compressor 21 is of an inverter-controlled variable-displacement type, in which an inverter circuit 32 (described later) controls an operating frequency of a motor. The controlling of the frequency of the motor changes the displacement of the compressor 21.

The four-passage switch valve 23 switches a direction in which the refrigerant circulates in the refrigerant circuit between a cooling operation and a heating operation.

In the cooling operation, a valve body of the four-passage switch valve 23 is shifted to a first position (position indicated by the solid lines of the four-passage switch valve 23 in FIG. 1) so that the refrigerant sequentially (in the direction of the solid-line arrow in FIG. 1) flows to the expansion valve 11, the indoor heat exchanger 12, the compressor 21, and the outdoor heat exchanger 22. In this case, the indoor heat exchanger 12 acts as an evaporator and the outdoor heat exchanger 22 acts as a condenser.

In the heating operation, the valve body of the four-passage switch valve 23 is shifted to a second position (position indicated by the broken lines of the four-passage switch valve 23 in FIG. 1) so that the refrigerant sequentially (in the direction of the broken-line arrow in FIG. 1) flows to the compressor 21, the indoor heat exchanger 12, the expansion valve 11, and the outdoor heat exchanger 22. In this case, the indoor heat exchanger 12 acts as a condenser and the outdoor heat exchanger 22 acts as an evaporator.

In a blowing operation, the operations of the compressor 21 and the outdoor fan 24 are stopped, and the indoor fan 13 is driven. In the blowing operation, the valve body of the four-passage switch valve 23 is set at the first position or the second position.

The controller 30 includes a control circuit 31 and an inverter circuit 32 that produces an alternating current from a direct current. The control circuit 31 controls the expansion valve 11, the compressor 21, and the four-passage switch valve 23 based on output signals, which are output from a remote controller 33 and various sensors 34, 35, 36.

The remote controller 33 is a device used to set the amount of air sent from the indoor unit 10 and the room temperature that is to be reached by the operation of the air conditioner 1 (hereafter, referred to as the "set temperature"). The indoor unit 10 includes the remote controller 33 as a component of the indoor unit 10.

The various sensors connected to the controller 30 include a refrigerant temperature sensor 34 measuring the temperature of the refrigerant, a pressure sensor 35 detecting suction pressure Ps of the compressor 21, and a room temperature sensor 36 measuring the room temperature.

The refrigerant temperature sensor 34 is arranged on an end of the indoor heat exchanger 12 opposite to the end of the indoor heat exchanger 12 that is closer to the compressor 21. More specifically, the refrigerant temperature sensor 34 is arranged in an inlet 12a, to which the refrigerant flows when the indoor heat exchanger 12 acts as the evaporator. The refrigerant temperature sensor 34 measures the temperature of the refrigerant in the inlet 12a of the indoor heat exchanger 12 and outputs a signal corresponding to the refrigerant temperature (hereafter, referred to as the "refrigerant temperature signal").

The pressure sensor 35 is arranged in the suction port 21a of the compressor 21. More specifically, the pressure sensor 35 measures the pressure of the refrigerant gas drawn by the compressor 21 and outputs a signal corresponding to the pressure (hereafter, referred to as the "suction pressure signal"). In the description, hereafter, the "suction pressure Ps" refers to the pressure corresponding to the suction pressure signal.

The room temperature sensor 36 is arranged at an intake side of the indoor fan 13 and measures the temperature of the indoor air drawn into the indoor unit 10. The room temperature sensor 36 outputs a signal corresponding to the measured temperature (room temperature signal).

Based on a control signal output from the control circuit 31, the inverter circuit 32 produces an alternating current used to generate rotations of the motor of the compressor 21 at a predetermined speed. The inverter circuit 32 includes a switching element, such as an IGBT (abbreviation of insulated gate bipolar transistor) and a high-voltage MOSFET (abbreviation of metal-oxide-semiconductor field-effect transistor).

The control circuit 31 shifts the position of the four-passage switch valve 23 based on an operation mode indicating one of the cooling operation, the heating operation, and the blowing operation.

The control circuit 31 also controls the displacement of the compressor 21 based on a heating load or a cooling load.

In the cooling operation, the control circuit 31 executes a thermo-off control. In the thermo-off control, when the room temperature reaches a lower limit set temperature, which is a temperature lower than the set temperature by a predetermined amount, the operation of the compressor 21 is stopped.

The control circuit 31 obtains an evaporation temperature that corresponds to the refrigerant temperature signal and then obtains evaporation pressure Pe that corresponds to the evaporation temperature using data, such as the Mollier diagram, or a predetermined conversion equation. Then, the control circuit 31 obtains a pressure loss coefficient K based on the evaporation pressure Pe and the above suction pressure Ps.

The control circuit 31 includes a deviation determination unit 31a that determines whether or not the room temperature is stabilized at a temperature deviated from the set temperature. The deviation determination unit 31a performs a process for determining whether or not the room temperature is stabilized at a temperature deviated from the set temperature (described later as the process of step S32 in the "pressure loss changing process").

The displacement control of the compressor 21 performed by the control circuit 31 will now be described.

In the cooling operation, the control circuit 31 controls the displacement of the compressor 21 so that the evaporation temperature is maintained at a predetermined temperature (hereafter, referred to as the "set evaporation temperature Tet").

The maintenance of the evaporation temperature at the set evaporation temperature Tet (e.g., 5° C.) will now be described.

The control circuit 31 maintains the evaporation temperature at the set evaporation temperature Tet (e.g., 5° C.) to perform the cooling operation corresponding to the cooling load. More specifically, when the room temperature increases (when the cooling load increases), the evaporation temperature increases. To inhibit such an increase of the evaporation temperature, the flow rate of the refrigerant is increased so that the evaporation temperature is maintained at the set evaporation temperature Tet. This increases the amount of heat exchanged between the indoor air and the refrigerant in the indoor heat exchanger 12 and limits increases in the room temperature.

In contrast, when the room temperature decreases (when the cooling load decreases), the evaporation temperature decreases. To inhibit such a decrease of the evaporation temperature, the flow rate of the refrigerant is decreased so that the evaporation temperature is maintained at the set evaporation temperature Tet. This decreases the amount of heat exchanged between the indoor air and the refrigerant in the indoor heat exchanger 12 and limits decreases in the room temperature. That is, the control for maintaining the evaporation temperature at the set evaporation temperature Tet is the same as a control for adjusting a cooling performance in accordance with the cooling load.

In the control for maintaining the evaporation temperature at the set evaporation temperature Tet, the compressor 21 operates as follows.

When the room temperature increases (when the cooling load increases), the flow rate of the refrigerant is increased so that increases in the evaporation temperature is limited. More specifically, when the cooling load increases, the controller 30 increases the operating frequency of the compressor 21 so that the rotation speed of the compressor 21 is increased.

When the room temperature decreases (when the cooling load decreases), the flow rate of the refrigerant is decreased so that decreases in the evaporation temperature is limited. More specifically, when the cooling load decreases, the controller 30 decreases the operating frequency of the compressor 21 so that the rotation speed of the compressor 21 is decreased.

Figure 2:
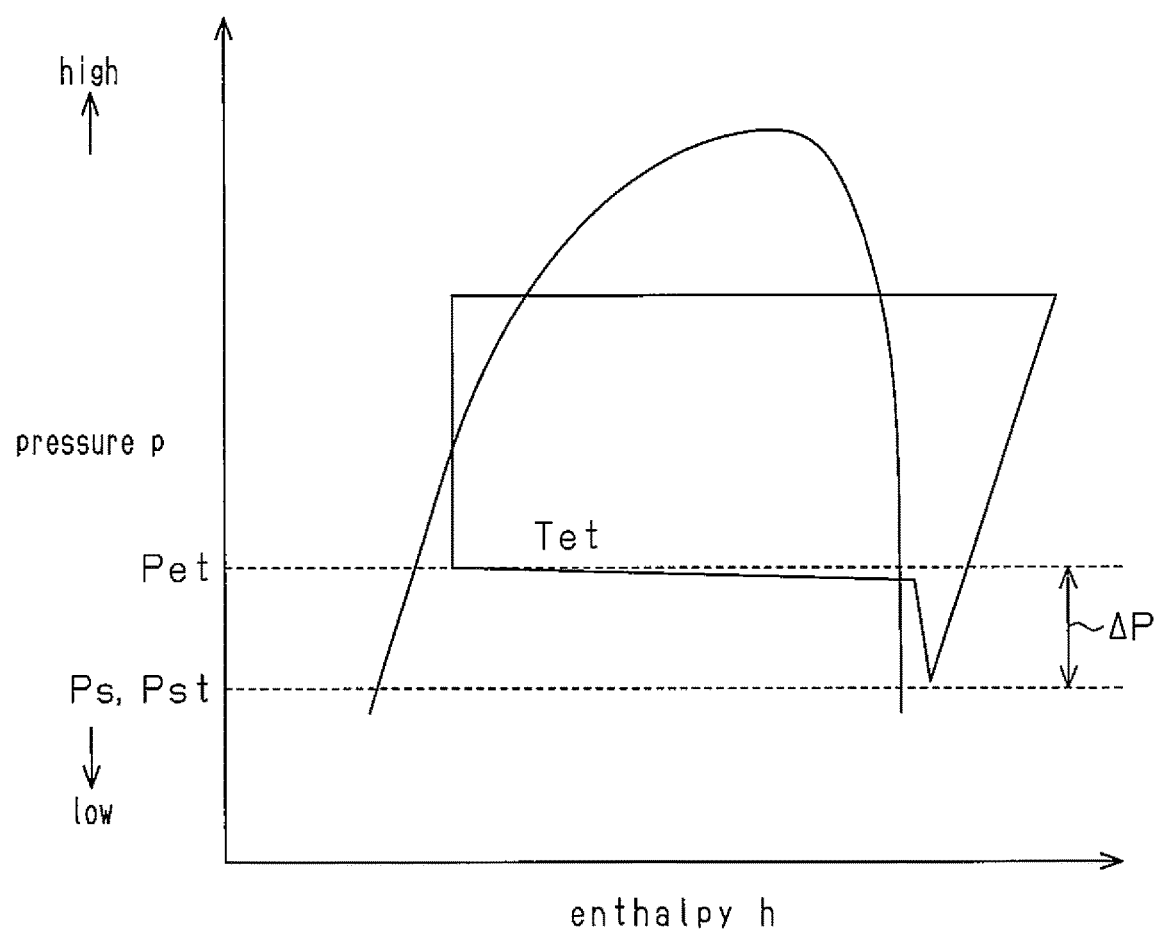
FIG. 2 is a p-h diagram showing a refrigeration cycle during a cooling operation.

The displacement control of the compressor 21 including pressure loss $\Delta P$ will now be described with reference to FIG. 2.

The evaporation temperature can be replaced by the evaporation pressure Pe based on the Mollier diagram. Thus, the control for maintaining the evaporation temperature at the set evaporation temperature Tet is substantially the same as a control for maintaining the evaporation pressure Pe at predetermined pressure (hereafter, set evaporation pressure Pet). Additionally, the evaporation pressure Pe may be controlled based on the suction pressure Ps of the compressor 21. Thus, in the displacement control of the compressor 21, a control for maintaining the suction pressure Ps at target suction pressure Pst is performed so that the evaporation temperature is maintained at the set evaporation temperature Tet, or the evaporation pressure Pe is maintained at the set evaporation pressure Pet.

Equation (1) shows the relationship between the suction pressure Ps and the evaporation pressure Pe.

$$Ps = Pe - \Delta P \tag{1}$$

Here, Pe represents the evaporation pressure Pe, Ps represents the suction pressure Ps, and $\Delta P$ represents the pressure loss $\Delta P$.

The pressure loss $\Delta P$ mainly results from pressure loss in the low pressure refrigerant connection pipe 40 extending from the indoor heat exchanger 12 to the compressor 21. More specifically, during the cooling operation, when the refrigerant flows out from the indoor heat exchange 12 and passes through the low pressure refrigerant connection pipe 40, the refrigerant expands. This results in the pressure loss $\Delta P$.

In equation (1), an estimation of the pressure loss $\Delta P$ allows for the control for maintaining the evaporation pressure Pe at the set evaporation pressure Pet (pressure corresponding to the set evaporation temperature Tet) based on the suction pressure Ps. For example, the maintaining of the evaporation pressure Pe at the set evaporation pressure Pet is equivalent to the maintaining of the suction pressure Ps at a value obtained by subtracting the pressure loss $\Delta P$ from the set evaporation pressure Pet (hereafter, target suction pressure Pst) (refer to equation (2)).

$$Pst = Pet - \Delta P \tag{2}$$

Here, Pst represents the target suction pressure Pst, which is a target value of the suction pressure Ps. Pet represents the set evaporation pressure Pet, which is a target value of the evaporation pressure Pe.

The pressure loss ΔP varies in accordance with the flow rate of the refrigerant flowing into the low pressure refrigerant connection pipe 40, that is, the rotation speed of the compressor 21, or the operating frequency of the compressor 21. More specifically, as the operating frequency of the compressor 21 increases, the pressure loss ΔP increases. Thus, the pressure loss ΔP is expressed as equation (3).

$$\Delta P = K \times f \quad (3)$$

Here, K represents the pressure loss coefficient K, which is determined by, for example, the installation condition of the air conditioner 1 and the length of the low pressure refrigerant connection pipe 40, and f represents the operating frequency f of the compressor 21.

Equation (3) is assigned to equation (2) to obtain equation (4).

$$Pst = Pet - K \times f \quad (4)$$

Here, Pst represents the target suction pressure Pst, which is a target value of the suction pressure Ps, K represents the pressure loss coefficient K, and f represents the operating frequency f of the compressor 21.

The above description suggests the following.

In equation (4), the target suction pressure Pst is in correspondence with the set evaporation pressure Pet. Thus, the control for maintaining the evaporation pressure Pe at the set evaporation pressure Pet can be replaced by a control for maintaining the suction pressure Ps at the target suction pressure Pst (pressure defined by equation (4)). The present embodiment performs the control for maintaining the suction pressure Pst at the target suction pressure Pst (refer to the "compressor control" in FIG. 3).

The pressure loss ΔP mainly results from the pressure loss in the low pressure refrigerant connection pipe 40 extending from the indoor heat exchanger 12 to the compressor 21. Thus, it can be assumed that the pressure loss LIP occurs from the inlet 12a of the indoor heat exchanger 12 to the suction port 21a of the compressor 21. That is, the pressure loss ΔP is expressed as equation (5).

$$\Delta P = Pe - Ps \quad (5)$$

Here, Pe represents inlet pressure of the inlet 12a of the indoor heat exchanger 12 (i.e., evaporation pressure Pe), and Ps represents pressure of the suction port 21a of the compressor 21 (i.e., suction pressure Ps). Hereafter, the description refers to the "evaporation pressure Pe−suction pressure Ps" as an actual pressure difference ΔPr.

Equation (6) is obtained from equation (3) and equation (5).

$$K = (Pe - Ps)/f \quad (6)$$

Using equation (6), the pressure loss coefficient K can be uniquely set for the air conditioner 1 based on the difference between the evaporation pressure Pe and the suction pressure Ps at a predetermined operating frequency f.

In the embodiment, for the sake of simplicity, the pressure loss coefficient K of the air conditioner 1 is set using a map (refer to FIG. 4) during a test-run performed when installing the air conditioner 1. The map shows the relationship between the pressure loss coefficient K and the "evaporation pressure Pe−suction pressure Ps" when the compressor 21 operates at the predetermined operating frequency f. The map is created in advance based on, for example, an experiment or a simulation. The map is stored in a memory of the controller 30 and referred to when the pressure loss coefficient K is to be obtained (refer to the "pressure loss coefficient initial setting process" in FIG. 5).

Figure 3:
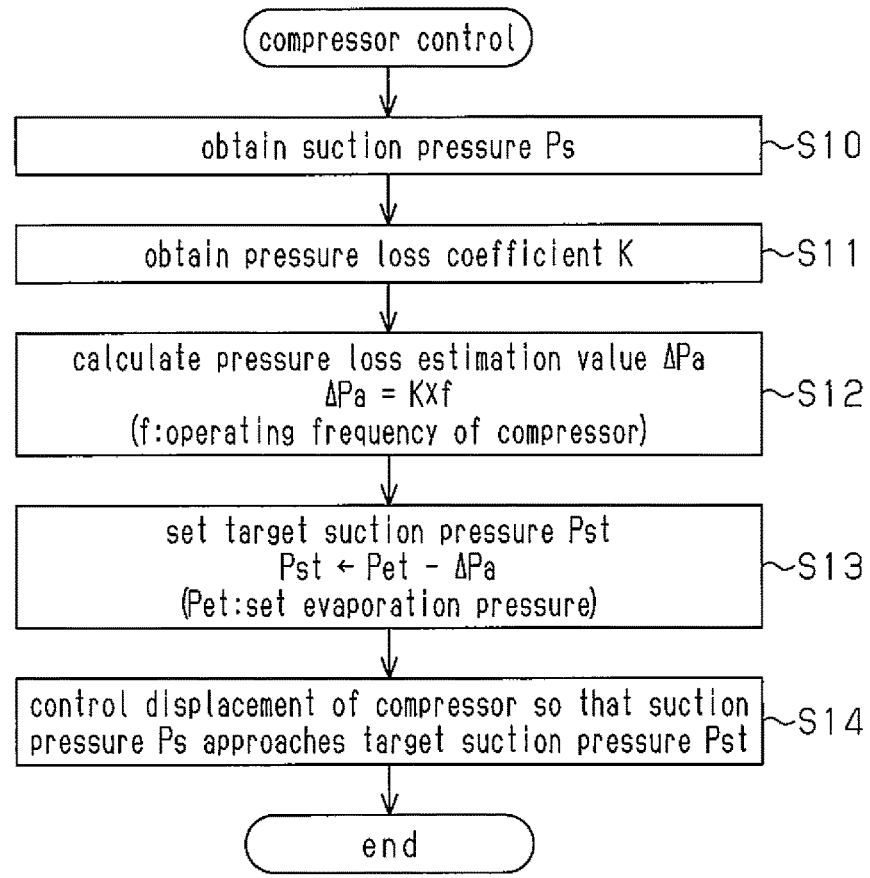
FIG. 3 is a flowchart showing the procedures for performing a "compressor control".

The procedures for controlling the compressor 21 will now be described with reference to FIG. 3.

In step S10, the controller 30 obtains the suction pressure Ps of the compressor 21.

In step S11, the controller 30 obtains the pressure loss coefficient K from the memory of the controller 30.

In step S12, the controller 30 calculates the pressure loss estimation value ΔPa based on the pressure loss coefficient K stored in the memory and the operating frequency f at the time of the present control. The pressure loss estimation value ΔPa is obtained using equation (3).

In step S13, the controller 30 sets the target suction pressure Pst by subtracting the pressure loss estimation value ΔPa from the set evaporation pressure Pet. The set evaporation pressure Pet is set to be a fixed value based on the set evaporation temperature Tet.

In step S14, the controller 30 controls the displacement of the compressor 21 so that the suction pressure Ps approaches the target suction pressure Pst. For example, when the suction pressure Ps is lower than the target suction pressure Pst, the displacement of the compressor 21 is decreased so that the suction pressure Ps approaches the target suction pressure Pst. When the suction pressure Ps is higher than the target suction pressure Pst, the displacement of the compressor 21 is increased so that the suction pressure Ps approaches the target suction pressure Pst.

The process for setting the pressure loss coefficient K will now be described with reference to FIGS. 4 and 5.

The pressure loss coefficient K is a value unique to the air conditioner 1. More specifically, the pressure loss coefficient K is determined by, for example, the installation condition of the air conditioner 1 and the length of the low pressure refrigerant connection pipe 40. Thus, even among the air conditioners 1 of the same type, the pressure loss coefficient K varies depending on the installation condition of the air conditioner 1 and the length of the low pressure refrigerant connection pipe 40. Therefore, in an installation of the air conditioner 1, when the indoor unit 10 and the outdoor unit 20 are installed and the low pressure refrigerant connection pipe 40 is fixed, the air conditioner 1 performs a test-run to obtain the actual pressure difference ΔPr. Then, referring to the map showing the relationship between the actual pressure difference ΔPr and the pressure loss coefficient K, the pressure loss coefficient K corresponding to the air conditioner 1 is set based on the obtained actual pressure difference ΔPr.

Figure 4:
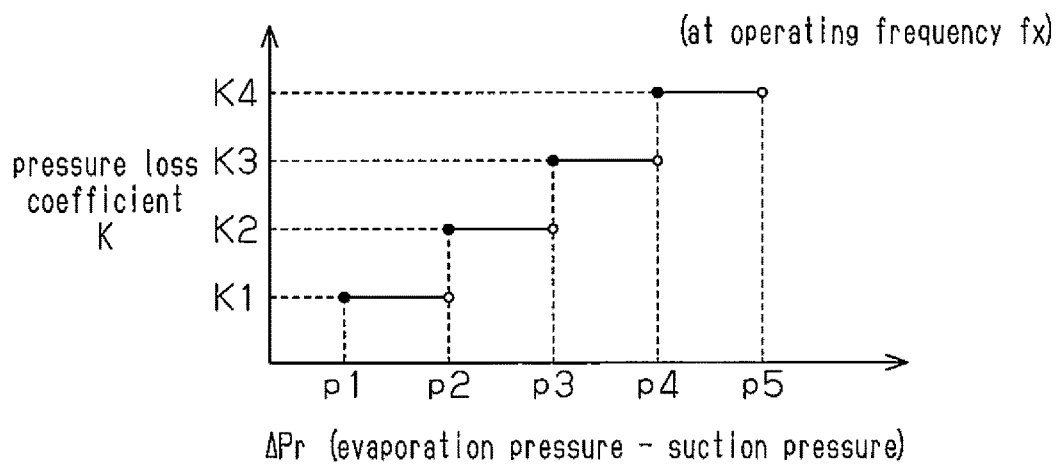
FIG. 4 is a map showing the relationship between "evaporation pressure–suction pressure" and "pressure loss coefficient".
Figure 5:
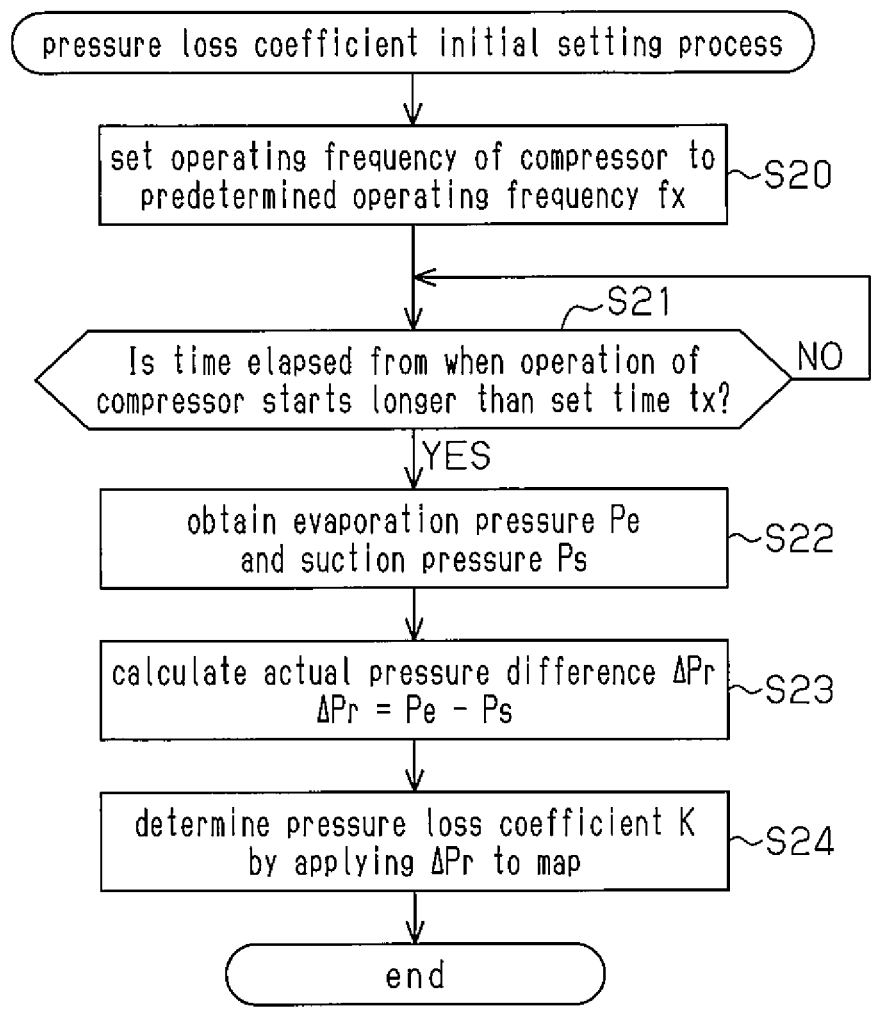
FIG. 5 is a flowchart showing the procedures for performing a "pressure loss coefficient initial value setting process".

FIG. 4 is one example of the map. In the map, when the actual pressure difference ΔPr is pressure p1 or greater and less than pressure p2, the pressure loss coefficient K is set at value K1. When the actual pressure difference ΔPr is pressure p2 or greater and less than pressure p3, the pressure loss coefficient K is set at value K2. When the actual pressure difference ΔPr is pressure p3 or greater and less than pressure p4, the pressure loss coefficient K is set at value K3. When the actual pressure difference ΔPr is pressure p4 or greater and less than pressure p5, the pressure loss coefficient K is set at value K4. The map is used when the compressor 21 operates at a predetermined operating frequency fx.

The "pressure loss coefficient initial setting process", which is executed in the test-run of the air conditioner 1 when installed, will now be described with reference to FIG. 5.

In step S20, during a test-run performed when installing the air conditioner 1, the compressor 21 operates at a predetermined displacement (predetermined operating frequency Fx) in a cooling operation.

In step S21, the controller 30 determines whether or not the room temperature is maintained constant. More specifically, the determination is made based on whether or not a time elapsed from when the operation of the compressor 21 starts is longer than a set time tx. When the elapsed time is longer than the set time tx, the controller 30 determines that the room environment is such that the room temperature is maintained constant and proceeds to step S22. When the elapsed time is the set time tx or shorter, the compressor 21 operates at the predetermined operating frequency fx until the set time tx elapses from when the operation of the compressor 21 starts.

In step S22, the controller 30 obtains the evaporation pressure Pe and the suction pressure Ps.

For example, the controller 30 obtains a refrigerant temperature signal, which is output from the refrigerant temperature sensor 34, and calculates the evaporation pressure Pe based on the refrigerant temperature signal. The controller 30 also obtains a suction pressure signal from the pressure sensor 35 and calculates the suction pressure Ps based on the suction pressure signal.

In step S23, the controller 30 subtracts the suction pressure Ps from the evaporation pressure Pe to obtain a value (actual pressure difference ΔPr). In step S24, the controller 30 calculates the pressure loss coefficient K based on the actual pressure difference ΔPr ("evaporation pressure Pe−suction pressure Ps") at the time of the present process with reference to the map (FIG. 4). The pressure loss coefficient K, which is obtained in the above manner, is stored in the memory of the controller 30 as a value unique to the air conditioner 1.

Figure 6:
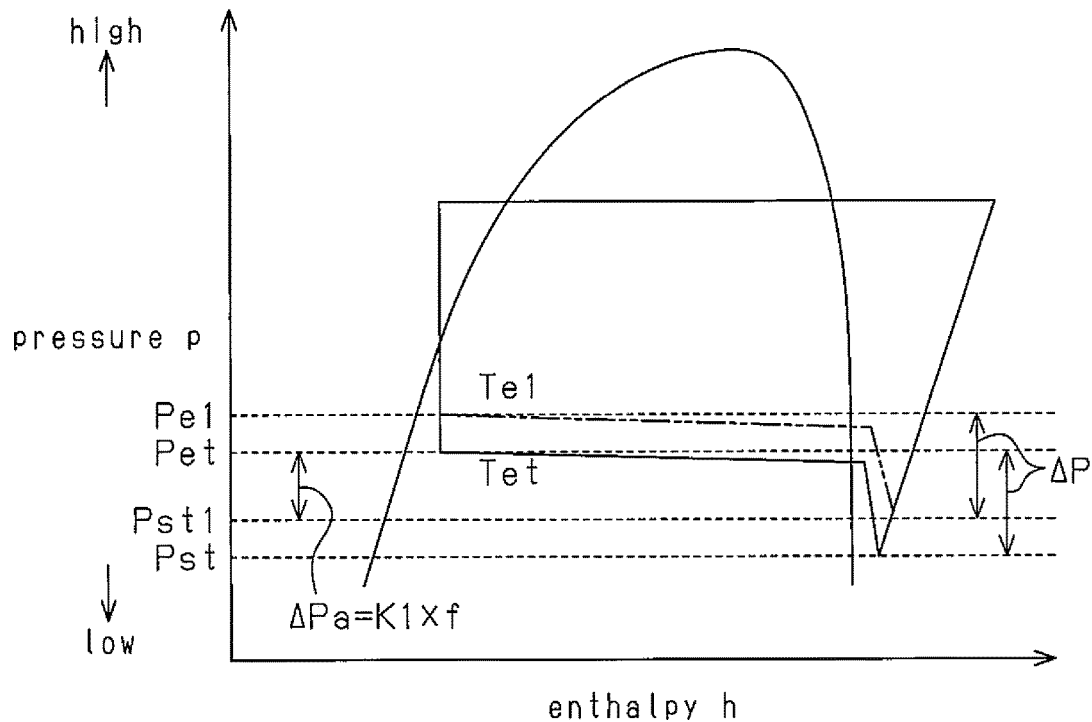
FIG. 6 is a p-h diagram showing a refrigeration cycle during a cooling operation.

The changing of the pressure loss ΔP of the air conditioner 1 will now be described with reference to FIG. 6.

As described above, the pressure loss coefficient K is set during a test-run performed when installing the air conditioner 1. However, when set in such a manner, the pressure loss coefficient K may not be an appropriate value. For example, if the atmospheric temperature is abnormally higher than that of the average year when the air conditioner 1 is installed, the pressure loss ΔP increases. Thus, at an abnormally high temperature, the actual pressure difference ΔPr obtained in the test-run is greater than the pressure loss ΔP obtained in a test-run under a condition that is within a predetermined expected range of a test-run condition. In this case, the pressure loss coefficient K of the air conditioner 1 is set to be higher than the normal value.

Alternatively, a variance in the installation environment of the air conditioner 1 may change the pressure loss ΔP. For example, the outdoor unit 20 is installed in a place receiving a plenty of sunlight during daytime, and the pressure loss coefficient K of the air conditioner 1 is initially set. Then, the reception of sunlight during daytime may be decreased, for example, when a tall building is built in the neighborhood. In such a case, the amount of heat applied to the low pressure refrigerant connection pipe 40 is decreased compared to before the tall building is built. Thus, it is assumed that the pressure loss coefficient K of the air conditioner 1 is lower than the initial value.

When the pressure loss coefficient K of the air conditioner 1 is not appropriately set, the pressure loss estimation value ΔPa (i.e., K×f) is inappropriate (refer to equation (3)). This results in the target suction pressure Pst of the compressor 21 having an inappropriate value (refer to equation (4)).

One example of when the pressure loss coefficient K is inappropriate will now be described with reference to FIG. 6.

When the pressure loss coefficient K is set to have a smaller value (K1) than the normal pressure loss coefficient K, the pressure loss estimation value ΔPa (=K1×f) is estimated to be smaller than the normal pressure loss ΔP. Thus, the target suction pressure Pst is set to have a larger value (Pst1) than the normal target suction pressure Pst. In this case, the evaporation temperature is maintained at a higher temperature (Te1) than the set evaporation temperature Tet. This hinders the cooling of the room. For example, when the normal set evaporation temperature Tet is set, for example, at 5° C. and an inappropriate pressure loss coefficient K causes the actual evaporation temperature Te to be maintained at 10° C., decreases in the room temperature is hindered. In this case, when the cooling load is large, such as when the performance of the indoor unit 10 is low and when the room has an excessively large space, the room temperature does not approach the set temperature and is maintained at a higher temperature than the set temperature.

Figure 7:
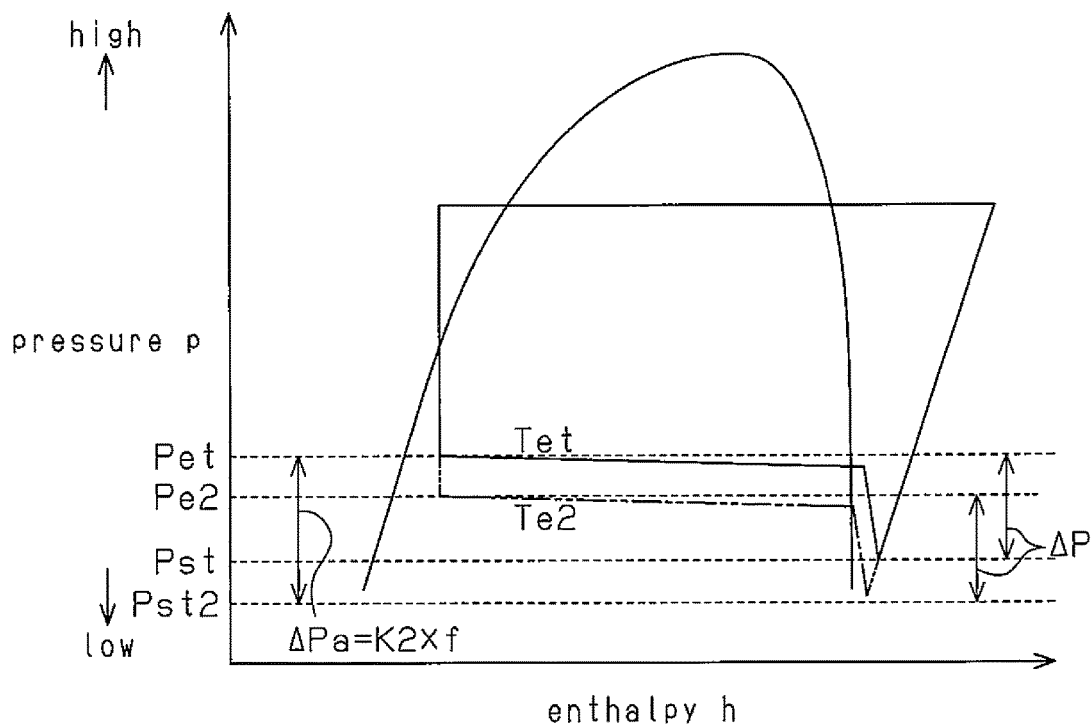
FIG. 7 is a p-h diagram showing a refrigeration cycle during a cooling operation.

Another example of when the pressure loss coefficient K is inappropriate will now be described with reference to FIG. 7.

When the pressure loss coefficient K is set to have a larger value (K2) than the normal pressure loss coefficient K, the pressure loss estimation value ΔPa (=K2×f) is estimated to be larger than the normal pressure loss ΔP. Thus, the target suction pressure Pst is set to have a smaller value (Pst2) than the normal target suction pressure Pst. In this case, the evaporation temperature is maintained at a lower temperature (Te2) than the set evaporation temperature Tet. This results in an environment in which the room is easily cooled. For example, when the normal set evaporation temperature Tet is set, for example, at 5° C. and an inappropriate pressure loss coefficient K causes the actual evaporation temperature Te to be maintained at 1° C., the room temperature is easily decreased. In this case, when the cooling load is small, such as when the performance of the indoor unit 10 is high and when the room has an excessively small space, the room temperature may be maintained at a lower temperature than the set temperature or continuously decreased. Consequently, the thermostat control may stop the operation of the compressor 21.

For the above reasons, the pressure loss coefficient K is changed when assumed to be inappropriate.

The determination whether or not the pressure loss coefficient K of the air conditioner 1 is appropriately set is performed as follows. Firstly, it is determined whether or not the operation of the compressor 21 is being stopped by the thermostat control. Secondly, it is determined whether or not the room temperature approaches the set temperature. More specifically, when the thermostat control stops the operation of the compressor 21 or the room temperature does not approach the set temperature, the pressure loss coefficient K is changed. The changing of the pressure loss coefficient K will now be described.

Figure 8:
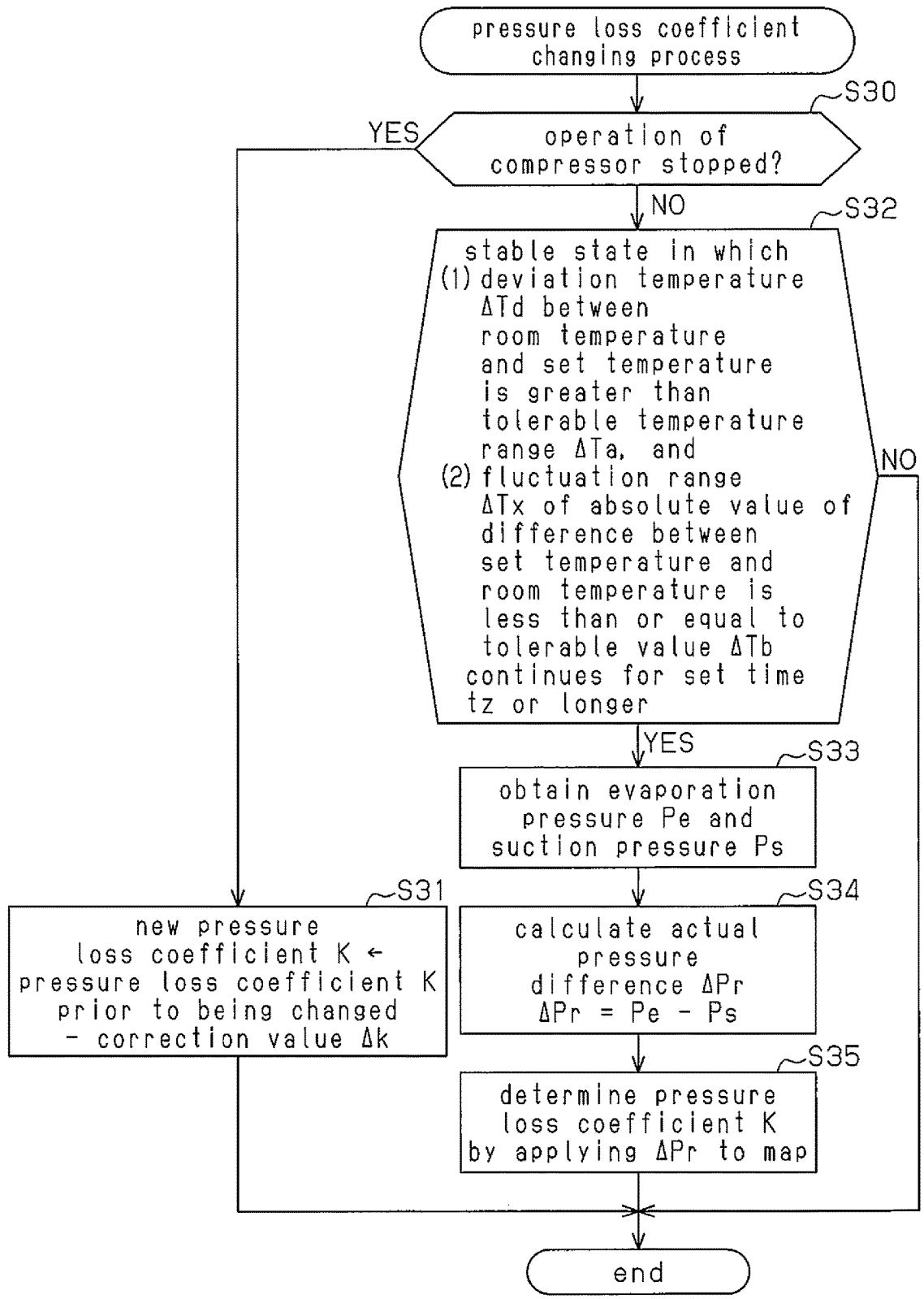
FIG. 8 is a flowchart showing the procedures for performing a "pressure loss coefficient changing process".

FIG. 8 shows the procedures for the "pressure loss coefficient changing process" executed by the controller 30.

The process for changing the pressure loss coefficient K is executed by the controller 30 in predetermined periods.

In step S30, the controller 30 determines whether or not the operation of the compressor 21 is being stopped by the thermostat control. When the controller 30 determines that the operation of the compressor 21 is stopped by the thermostat control, that is, the room temperature is excessively decreased, the controller 30 proceeds to step S31.

In step S31, the controller 30 changes the pressure loss coefficient K to a value smaller than that prior to being changed. This is because When the room temperature is excessively decreased, it is assumed that the pressure loss coefficient K is excessively large.

For example, a value obtained by subtracting a correction value Δk from the pressure loss coefficient K, prior to being changed, is set as a new pressure loss coefficient K. Instead of such a correction, the pressure loss coefficient K may be changed to a value smaller than that prior to being changed by multiplying the pressure loss coefficient K by a correction coefficient kx (kx<1).

In step S30, when the controller 30 determines that the compressor 21 is operating (determined "no" in step S30), the controller 30 proceeds to step S32.

In step S32, the controller 30 determines whether or not the room temperature is stabilized at a temperature deviated from the set temperature. This determination is performed in accordance with the following determination requirement (refer to FIGS. 8 and 9). The determination process is executed by the deviation determination unit 31a of the control circuit 31.

The determination requirement is that a state in which a first requirement and a second requirement are satisfied (i.e., stable state) continues for a set time tz or longer.

The first requirement is that a deviation temperature ΔTd between the room temperature and the set temperature is greater than a tolerable temperature range ΔTa. The deviation temperature ΔTd is an absolute value of the difference between the room temperature and the set temperature. The second requirement is that a fluctuation range ΔTx of the absolute value of the difference between the room temperature and the set temperature is less than or equal to a tolerable value ΔTb. The fluctuation range ΔTx is a difference between the minimal value and the maximum value of the absolute value of the difference between the set temperature and the room temperature in a period starting from when the first requirement is satisfied and ending when the process of the second requirement is terminated.

When the determination requirement is not satisfied, the controller 30 determines that the room temperature tends to approach the set temperature or that the room temperature is not maintained constant and temporarily terminates the "pressure loss coefficient changing process".

When the determination requirement is satisfied, the controller 30 determines that the room temperature is stabilized at a temperature deviated from the set temperature (step S32: YES) and executes the processes of step S33, step S34, and step S35.

In step S33, the controller 30 obtains an operating frequency fm of the compressor 21 at the time of the present process and then obtains the evaporation pressure Pe and the suction pressure Ps. In next step S34, the controller 30 calculates a value obtained by subtracting the suction pressure Ps from the evaporation pressure Pe as the actual pressure difference ΔPr.

In next step S35, the controller 30 obtains the pressure loss coefficient K corresponding to the actual pressure difference ΔPr with reference to the above map. The map shows the relationship between the pressure loss coefficient K and the pressure loss ΔP at the operating frequency fx. Thus, when the pressure loss ΔP is obtained at the operating frequency fm, which differs from the operating frequency fx, the following process is performed. More specifically, the controller 30 uses the predetermined conversion equation to convert the actual pressure difference ΔPr at the operating frequency fm into the actual pressure difference ΔPr at the operating frequency fx. Then, the controller 30 obtains the pressure loss coefficient K that corresponds to the converted actual pressure difference ΔPr with reference to the map.

The operation of the "pressure loss coefficient changing process" will now be described with reference to FIG. 9.

Figure 9:
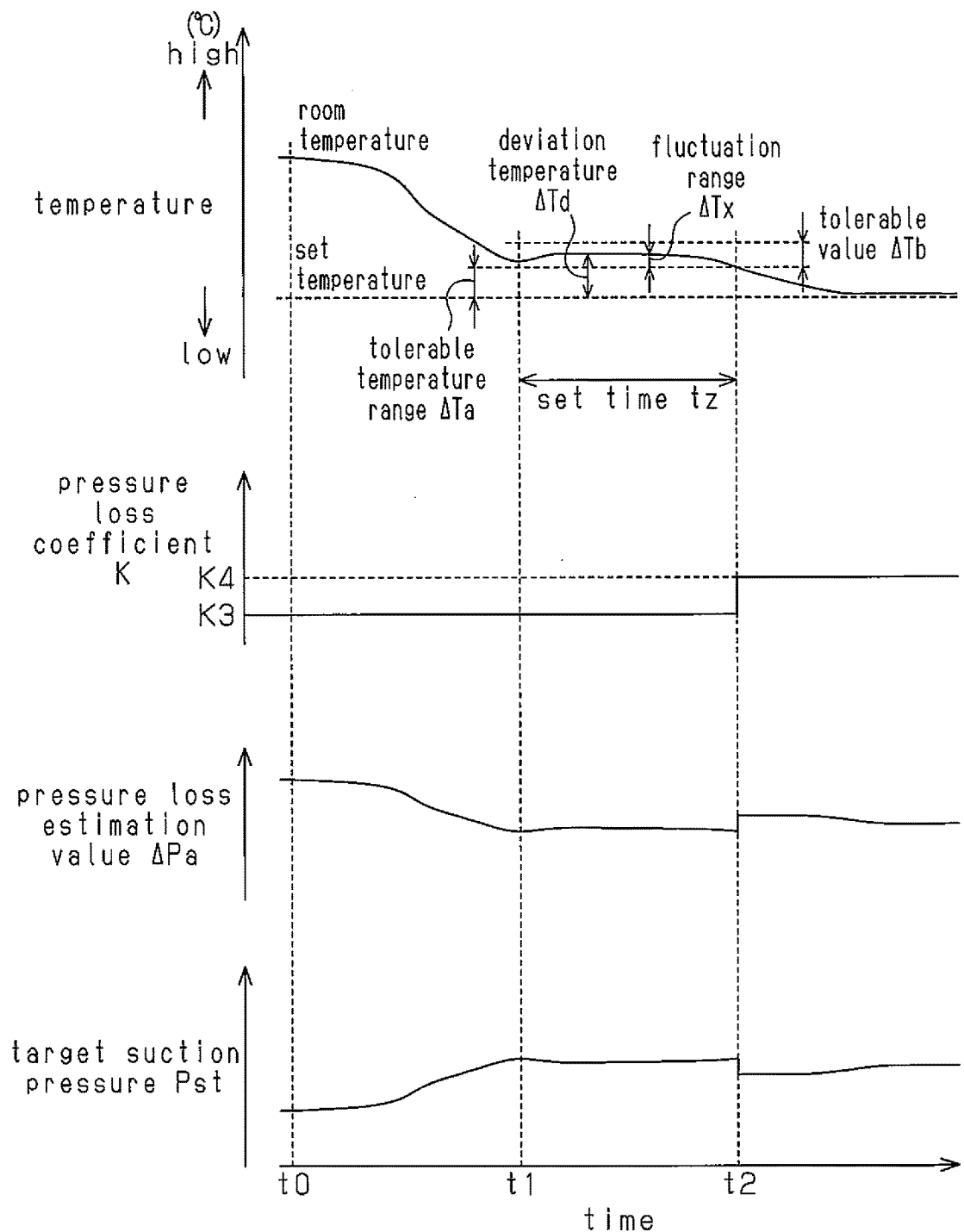
FIG. 9 is a diagram showing temporal changes of room temperature, a set temperature, the pressure loss coefficient, a pressure loss estimation value, and a target suction pressure.

FIG. 9 shows temporal changes of the room temperature, the set temperature, the pressure loss coefficient K, the pressure loss estimation value ΔPa, and the target suction pressure Pst.

Time t0 indicates when a cooling operation is started. At this point, the room temperature is higher than the set temperature. The pressure loss coefficient K is set to the value K3. The cooling load is large immediately after the cooling operation is started.

From time t0 to time t1, the room temperature decreases and gradually approaches the set temperature.

As the room temperature is decreased, the cooling load becomes smaller. This decreases the operating frequency of the compressor 21. Thus, the pressure loss estimation value ΔPa, which is obtained when calculating the target suction pressure Pst, is gradually decreased. As the pressure loss estimation value ΔPa is decreased, the target suction pressure Pst has a larger value.

From time t1, the room temperature stops decreasing and is maintained at a temperature deviated from the set temperature. Then, the deviation determination unit 31a determines whether or not the deviated state stably continues. More specifically, it is determined whether or not the state (i.e., stable state) continues for the set time tz or longer where the deviation temperature ΔTd exceeds the tolerable temperature range ΔTa (first requirement) and the fluctuation range ΔTx of the absolute value of the difference between the set temperature and the room temperature is less than or equal to the tolerable value ΔTb (second requirement). When this determination requirement is satisfied, the deviation determination unit 31a determines that the room temperature is stabilized at a temperature deviated from the set temperature. That is, in this case, it is determined that the pressure loss coefficient K is inappropriate.

The deviation of the room temperature from the set temperature occurs due to the inappropriate setting of the pressure loss estimation value ΔPa. The pressure loss estimation value ΔPa is dependent on the pressure loss coefficient K (refer to equation (3)). Consequently, the deviation of the room temperature from the set temperature occurs due to the inappropriate setting of the pressure loss coefficient K.

At time t2, when it is determined that the room temperature is stabilized at a temperature deviated from the set temperature, the process of steps S33 to S35 in the "pressure loss coefficient changing process" are executed. In this example, through the process, the pressure loss coefficient K is changed from the value K3 to the value K4, which is larger than the value K3. Consequently, the pressure loss estimation value ΔPa is set to be larger than that prior to being changed, and the target suction pressure Pst is set to be smaller than that prior to being changed. When the target suction pressure Pst is changed to have a smaller value in this manner, the evaporation pressure Pe and the evaporation temperature Te of the indoor heat exchanger 12 are decreased. Thus, the room temperature approaches the set temperature. More specifically, the room environment starts shifting from a state in which the room temperature is constantly maintained at a temperature deviated from the set temperature to a state in which the room temperature approaches the set temperature.

As described above, when the room temperature is stabilized at a temperature deviated from the set temperature and the deviation temperature $\Delta Td$ exceeds the predetermined tolerable temperature range $\Delta Ta$, the pressure loss coefficient K is corrected. More specifically, the pressure loss estimation value $\Delta Pa$ is changed so that the room temperature approaches the set temperature. This reduces the frequency of occurrence of situations in which the room temperature does not approach the set temperature.

The present embodiment has the advantages described below.

(1) To maintain the constant evaporation temperature of the indoor heat exchanger 12, the controller 30 of the air conditioner 1 obtains a value by subtracting the pressure loss estimation value $\Delta Pa$, which pressure loss occurs from the inlet 12a of the indoor heat exchanger 12 to the suction port 21a of the compressor 21, from the evaporation pressure Pe of the indoor heat exchanger 12 and sets the obtained value as the target suction pressure Pst. The controller 30 controls the displacement of the compressor 21 so that the suction pressure Ps becomes equal to the target suction pressure Pst. Thus, the room temperature approaches the set temperature during a cooling operation. When the room temperature is stabilized at a temperature deviated from the set temperature, the controller 30 changes the pressure loss estimation value $\Delta Pa$ so that the room temperature approaches the set temperature.

In the above configuration, when the room temperature is stabilized at a temperature deviated from the set temperature, the pressure loss estimation value $\Delta Pa$ is changed so that the room temperature approaches the set temperature. Thus, the pressure loss estimation value $\Delta Pa$ approaches the actual pressure loss $\Delta P$. This reduces the frequency of occurrence of situations in which the room temperature does not approach the set temperature.

Additionally, for example, when wear occurs in a heat insulation material covering the low pressure refrigerant connection pipe 40 or when the low pressure refrigerant connection pipe 40 is replaced or repaired, the amount of loss in the pipe is varied. This may result in deviation of the room temperature from the set temperature. Even in this case, when the condition is satisfied in which the room temperature is stabilized at a temperature deviated from the set temperature, the pressure loss estimation value $\Delta Pa$ is changed. This limits the frequency of occurrence of situations in which the room temperature does not approach the set temperature for a long time.

(2) In the air conditioner 1 having the above configuration, when the determination requirement is satisfied in which the satisfactory state of the first requirement and the second requirement continues for the set time tx or longer, the controller 30 determines that the room temperature is stabilized at a temperature deviated from the set temperature.

Conversely, in the configuration, when the deviation temperature $\Delta Td$ temporarily exceeds the predetermined tolerable temperature range $\Delta Ta$ or the fluctuation range $\Delta Tx$ of the absolute value of the difference between the room temperature and the set temperature is temporarily less than or equal to the tolerable value $\Delta Tb$, it is not determined that the room temperature is stabilized at a temperature deviated from the set temperature. Thus, the pressure loss estimation value $\Delta Pa$ is not changed. This limits an improper changing of the pressure loss estimation value $\Delta Pa$.

(3) In the air conditioner 1 having the above configuration, the controller 30 calculates the pressure loss estimation value $\Delta Pa$ based on the operating frequency of the compressor 21 and the pressure loss coefficient K, which is uniquely set for the air conditioner 1 (refer to equation (3)). Additionally, the controller 30 corrects the pressure loss coefficient K based on the difference between the suction pressure Ps of the compressor 21 and the evaporation pressure Pe of the indoor heat exchanger 12 that are obtained when changing the pressure loss estimation value $\Delta Pa$ (steps S33 to S35 in FIG. 8). This correction of the pressure loss coefficient K changes the pressure loss estimation value $\Delta Pa$.

The pressure loss $\Delta Pa$ occurring from the inlet 12a of the indoor heat exchanger 12 to the suction port 21a of the compressor 21 varies in accordance with the operating frequency of the compressor 21. Thus, in the above configuration, the pressure loss estimation value $\Delta Pa$ is calculated based on the operating frequency of the compressor 21 and the pressure loss coefficient K. This allows the pressure loss estimation value $\Delta Pa$ to be set in correspondence with the operational state of the compressor 21.

Additionally, the pressure loss coefficient K is corrected based on the difference between the suction pressure Ps of the compressor 21 and the evaporation pressure Pe of the indoor heat exchanger 12 that are obtained when changing the pressure loss estimation value $\Delta Pa$. More specifically, the pressure loss coefficient K is based on the suction pressure Ps of the compressor 21 and the evaporation pressure Pe of the indoor heat exchanger 12, each of which is a measured value. This allows the pressure loss coefficient K to be set in correspondence with the pressure loss $\Delta P$ of the air conditioner 1 at the time of the correction. Thus, the pressure loss estimation value $\Delta Pa$ can be appropriately set to a value suitable for the actual state.

(4) In the air conditioner 1 having the above configuration, when the controller 30 stops the operation of the compressor 21 through the thermostat control, the controller 30 changes the pressure loss estimation value $\Delta Pa$ so that the room temperature approaches the set temperature (step S31 in FIG. 8).

When the pressure loss estimation value $\Delta Pa$ is excessively larger than the actual value, the room temperature continues to decrease below the set temperature. Consequently, the thermostat control stops the operation of the compressor 21. Conversely, occurrence of a state in which the operation of the compressor 21 is stopped by the thermostat operation refers to a state in which the pressure loss estimation value $\Delta Pa$ does not set to be an appropriate value. Thus, in the above configuration, when the operation of the compressor 21 is being stopped by the thermostat operation, the pressure loss estimation value $\Delta Pa$ is changed. This reduces the frequency of occurrence of situations in which the room temperature does not approach the set temperature.

(5) In the air conditioner 1 having the above configuration, when the operation of the compressor 21 is being stopped by the thermostat control, the controller 30 changes the pressure loss coefficient K to a value smaller than that prior to being changed when changing the pressure loss estimation value $\Delta Pa$ (refer to step S31 in FIG. 8).

Such a process for correcting the pressure loss coefficient K does not use data that needs to be measured, such as the suction pressure Ps and the evaporation pressure Pe. Thus, the pressure loss coefficient K can be changed even when the operation of the compressor 21 is being stopped.

MODIFIED EXAMPLES

Embodiments are not limited to the above embodiment and may be modified, for example, as follows. The modified examples may be combined.

In the above embodiment, in the process for changing the pressure loss coefficient K, when step S32 is affirmative, that is, it is determined that the room temperature is stabilized at a temperature deviated from the set temperature, the controller 30 obtains a new pressure loss coefficient K based on the difference (actual pressure difference ΔPr) between the evaporation pressure Pe and the suction pressure Ps with reference to the map (refer to steps S33 to S35). Here, when step S32 is affirmative, a process similar to step S31 may be performed instead of the process of steps S33 to S35. In this case, when the room temperature is stabilized at a higher temperature than the set temperature, a value obtained by adding the correction value Δk to the pressure loss coefficient K, prior to being changed, is set as a new pressure loss coefficient K. When the room temperature is stabilized at a lower temperature than the set temperature, a value obtained by subtracting the correction value Δk from the pressure loss coefficient K, prior to being changed, is set as a new pressure loss coefficient K.

In the above embodiment, in the process for changing the pressure loss coefficient K, when calculating a new pressure loss coefficient K with reference to the map, the controller 30 obtains the evaporation pressure Pe and the suction pressure Ps and calculates the new pressure loss coefficient K based on the difference between the evaporation pressure Pe and the suction pressure Ps (i.e., actual pressure difference ΔPr) with reference to the map. The evaporation pressure Pe used for calculating the actual pressure difference ΔPr is calculated based on the refrigerant temperature signal, which indicates the refrigerant temperature in the inlet 12a of the indoor heat exchanger 12. However, the evaporation pressure Pe may be obtained using a different process. For example, a pressure sensor may be arranged in the inlet 12a of the indoor heat exchanger 12 and measure pressure around the inlet 12a of the indoor heat exchanger 12. Then, the evaporation pressure Pe is obtained based on an output signal that is output from the pressure sensor.

In each control of the above embodiment, the inlet pressure, which is obtained in the inlet 12a of the indoor heat exchanger 12, is used as the evaporation pressure Pe. However, the pressure of the outlet of the indoor heat exchanger 12 (outlet pressure) may be used as the evaporation pressure Pe. In this case, advantages equivalent to advantages (1) to (3) of the above embodiment can be obtained.

In the above embodiment, the technique for solving the problem is applied to the air conditioner 1 including one indoor unit 10 and one outdoor unit 20. However, the technique may be applicable to an air conditioner 1 including a plurality of indoor units 10.

More specifically, the technique may be applicable to an air conditioner 1 in which each indoor unit 10 includes a refrigerant circuit and the refrigerant circuits of the indoor units 10 are connected in parallel to a refrigerant circuit that is arranged in the outdoor unit 20 and functions as a shared refrigerant circuit.

In this case, the low temperature refrigerant connection pipe may vary in the length from the refrigerant circuit of the outdoor unit 20 to each indoor unit 10. However, since the refrigerant circuits of the indoor units 10 are each connected to the shared refrigerant circuit, the refrigerant circuits of the indoor units 10 can be considered as a single refrigerant circuit connected to the refrigerant circuit of the outdoor unit 20 (refrigerant circuit including the compressor 21). When the refrigerant circuits of the indoor units 10 are considered as the single refrigerant circuit, the refrigerant circuits of the indoor units 10 can be treated as that having a single evaporation pressure (hereafter, referred to as the "considered evaporation pressure").

The evaporation pressure Pe of the indoor units 10 can be set, for example, using any of the following three calculation processes.

(1) In a first calculation process, an average value of the evaporation pressures Pe of the indoor units 10 is set as the considered evaporation pressure. The average value of the evaporation pressures Pe is calculated, for example, by any of the following processes (a) to (c). (a) The evaporation temperatures of the indoor units 10 are simply averaged and the obtained average value is converted into pressure to obtain the average value of the evaporation pressures Pe. Alternatively, (b) when each indoor unit has a predetermined weight, the respective weights and evaporation temperatures of the indoor units are multiplied and then averaged. The obtained weighted average value is converted into pressure to obtain the average value of the evaporation pressures Pe. Alternatively, (c) the respective capabilities (each of which is calculated based on the capacity of the indoor heat exchanger and the properties of the indoor fan) of the indoor units 10 and the respective evaporation temperatures of the indoor units 10 are multiplied and then averaged. The obtained weighted average value is converted into pressure to obtain the average value of the evaporation pressures Pe.

(2) In a second calculation process, for each indoor unit 10, the difference between the set temperature of the indoor unit 10 and the suction temperature of the compressor in the outdoor unit 20 is calculated. Then, the indoor unit 10 having the largest difference is found. The evaporation pressure Pe is detected (or calculated) based on the evaporation temperature of the indoor unit 10 having the largest difference. The value of this evaporation pressure Pe is treated as the considered evaporation pressure. More specifically, in this case, the actual pressure difference ΔPr is calculated with reference to the indoor unit 10 having the largest difference, among the indoor units 10, between the set temperature of the indoor unit 10 and the suction temperature of the compressor in the outdoor unit 20.

(3) In a third calculation process, for each indoor unit 10, the difference between the set temperature of the indoor unit 10 and the suction temperature of the compressor in the outdoor unit 20 is calculated. Then, the indoor unit 10 having the smallest difference is found. The evaporation pressure Pe is detected (or calculated) based on the evaporation temperature of the indoor unit 10 having the smallest difference. The value of this evaporation pressure Pe is treated as the considered evaporation pressure. More specifically, in this case, the actual pressure difference ΔPr is calculated with reference to the indoor unit 10 having the smallest difference, among the indoor units 10, between the set temperature of the indoor unit 10 and the suction temperature of the compressor in the outdoor unit 20.

As described above, in the air conditioner 1 including a plurality of indoor units 10, the above configuration allows for the setting of a single considered evaporation pressure based on the evaporation pressures Pe of the indoor units 10. Thus, the actual pressure difference ΔPr can be calculated based on equation (5) of the above embodiment. For the same reasons as described in the above embodiment, This reduces the frequency of occurrence of situations in which the room temperature does not approach the set temperature.

DESCRIPTION OF REFERENCE CHARACTERS

1: air conditioner, 10: indoor unit, 11: expansion valve, 12: indoor heat exchanger, 12a: inlet, 13: indoor fan, 20: outdoor unit, 21: compressor, 21a: suction port, 22: outdoor heat exchanger, 23: four-passage switch valve, 24: outdoor fan, 30: controller, 31: control circuit, 31a: deviation determination unit, 32: inverter circuit, 33: remote controller, 34: refrigerant temperature sensor, 35: pressure sensor, 36: room temperature sensor, 40: low pressure refrigerant connection pipe, 41: first connection pipe, 42: second connection pipe, 43: third connection pipe.

The invention claimed is:

1. An air conditioner comprising:
an indoor unit including an expansion valve and an indoor heat exchanger that exchanges heat with indoor air;
an outdoor unit including an inverter-controlled variable-displacement compressor and an outdoor heat exchanger that exchanges heat with outdoor air;
a controller that sets a target suction pressure of the inverter-controlled variable-displacement compressor to a value obtained by subtracting a pressure loss estimation value, which pressure loss occurs from an inlet of the indoor heat exchanger to a suction port of the inverter-controlled variable-displacement compressor, from an evaporation pressure of the indoor heat exchanger so that an evaporation temperature of the indoor heat exchanger is maintained constant, wherein the controller controls displacement of the inverter-controlled variable-displacement compressor so that a suction pressure of the inverter-controlled variable-displacement compressor becomes equal to the target suction pressure of the inverter-controlled variable-displacement compressor and a room temperature approaches a set temperature during a cooling operation; and
a deviation determination unit that determines whether or not the room temperature is stabilized at a temperature deviated from the set temperature,
wherein when the deviation determination unit determines that the room temperature is stabilized at a temperature deviated from the set temperature, the controller changes the pressure loss estimation value so that the room temperature approaches the set temperature.

2. The air conditioner according to claim 1, wherein the deviation determination unit determines that the room temperature is stabilized at a temperature deviated from the set temperature when a situation continues for a set time or longer where a deviation temperature, which indicates an absolute value of a difference between the room temperature and the set temperature, exceeds a predetermined tolerable temperature range and a fluctuation range of the absolute value of the difference between the set temperature and the room temperature is less than or equal to a tolerable value.

3. The air conditioner according to claim 1, wherein the controller calculates the pressure loss estimation value based on an operating frequency of the inverter-controlled variable-displacement compressor and a pressure loss coefficient, which is uniquely set for the air conditioner, and the controller changes the pressure loss estimation value by correcting the pressure loss coefficient based on a difference between the suction pressure of the inverter-controlled variable-displacement compressor and the evaporation pressure of the indoor heat exchanger that are obtained when changing the pressure loss estimation value.

4. The air conditioner according to claim 1, wherein the controller calculates the pressure loss estimation value based on an operating frequency of the inverter-controlled variable-displacement compressor and a pressure loss coefficient, which is uniquely set for the air conditioner, and when changing the pressure loss estimation value, the controller changes the pressure loss coefficient to a value larger than that prior to being changed when the room temperature is higher than the set temperature, and changes the pressure loss coefficient to a value smaller than that prior to being changed when the room temperature is lower than the set temperature.

5. The air conditioner according to claim 1, wherein the indoor unit is one of a plurality of indoor units, and the controller calculates an average value of evaporation pressures of the indoor units and uses the calculated value as the evaporation pressure of the indoor heat exchanger when setting the target suction pressure of the inverter-controlled variable-displacement compressor.

6. An air conditioner comprising:
an indoor unit including an expansion valve and an indoor heat exchanger that exchanges heat with indoor air;
an outdoor unit including an inverter-controlled variable-displacement compressor and an outdoor heat exchanger that exchanges heat with outdoor air; and
a controller that sets a target suction pressure of the inverter-controlled variable-displacement compressor to a value obtained by subtracting a pressure loss estimation value, which pressure loss occurs from an inlet of the indoor heat exchanger to a suction port of the inverter-controlled variable-displacement compressor, from an evaporation pressure of the indoor heat exchanger so that an evaporation temperature of the indoor heat exchanger is maintained constant, wherein the controller controls displacement of the inverter-controlled variable-displacement compressor so that a suction pressure of the inverter-controlled variable-displacement compressor becomes equal to the target suction pressure of the inverter-controlled variable-displacement compressor and a room temperature approaches a set temperature during a cooling operation, wherein
when the room temperature decreases to below a lower limit set temperature, which is assigned to the set temperature, the controller executes a thermostat control that stops operation of the inverter-controlled variable-displacement compressor, and
when the controller stops the operation of the inverter-controlled variable-displacement compressor through the thermostat control, the controller changes the pressure loss estimation value so that the room temperature approaches the set temperature.

7. The air conditioner according to claim 6, wherein the controller calculates the pressure loss estimation value based on an operating frequency of the inverter-controlled variable-displacement compressor and a pressure loss coefficient, which is uniquely set for the air conditioner, and when changing the pressure loss estimation value, the controller changes the pressure loss coefficient to a value smaller than the pressure loss coefficient prior to being changed.

8. The air conditioner according to claim 2, wherein the controller calculates the pressure loss estimation value based on an operating frequency of the inverter-controlled variable-displacement compressor and a pressure loss coefficient, which is uniquely set for the air conditioner, and the controller changes the pressure loss estimation value by correcting the pressure loss coefficient based on a difference between the suction pressure of the inverter-controlled variable-displacement compressor and the evaporation pressure of the indoor heat exchanger that are obtained when changing the pressure loss estimation value.

9. The air conditioner according to claim 2, wherein the controller calculates the pressure loss estimation value based on an operating frequency of the inverter-controlled variable-displacement compressor and a pressure loss coefficient, which is uniquely set for the air conditioner, and when changing the pressure loss estimation value, the controller changes the pressure loss coefficient to a value larger than that prior to being changed when the room temperature is higher than the set temperature, and changes the pressure loss coefficient to a value smaller than that prior to being changed when the room temperature is lower than the set temperature.

10. The air conditioner according to claim 2, wherein the indoor unit is one of a plurality of indoor units, and the controller calculates an average value of evaporation pressures of the indoor units and uses the calculated value as the evaporation pressure of the indoor heat exchanger when setting the target suction pressure of the inverter-controlled variable-displacement compressor.

11. The air conditioner according to claim 3, wherein the indoor unit is one of a plurality of indoor units, and the controller calculates an average value of evaporation pressures of the indoor units and uses the calculated value as the evaporation pressure of the indoor heat exchanger when setting the target suction pressure of the inverter-controlled variable-displacement compressor.

12. The air conditioner according to claim 4, wherein the indoor unit is one of a plurality of indoor units, and the controller calculates an average value of evaporation pressures of the indoor units and uses the calculated value as the evaporation pressure of the indoor heat exchanger when setting the target suction pressure of the inverter-controlled variable-displacement compressor.

* * * * *